2¼ D MEMORY

INVENTOR
JOHN W. SUMILAS
BY W. J. Roberts
ATTORNEY 3,508,218
2¼ D MEMORY

John W. Sumilas, Wappingers Falls, N.Y., assignor to International Business Machines Corporation, Armonk, N.Y., a corporation of New York Filed Jan. 13, 1967, Ser. No. 609,082
Int. Cl. G11c 5/02, 7/00
U.S. Cl. 340—174 7 Claims

ABSTRACT OF THE DISCLOSURE

Organization for coincident current magnetic memory in which current on one wire excites a group of storage elements that correspond to several distinct words, one of which is to be read and others of which are not. Circuit for establishing inhibit currents on other wires associated with words that are to be not read and to sense the signals that appear on corresponding wires of the word that is to be read.

INTRODUCTION—BACKGROUND

Although ferrite core memories for data processing systems are well known, it will be helpful to review some of the features that are particularly important in this invention. In such a memory, the elemental storage units are toroidal ferrite cores which are arranged in a matrix and are threaded by row and column wires. By appropriately energizing the wires threading a particular core, the core can be magnetized in either of two directions to represent either a logical 1 or 0 bit; this operation is called write. The core can also be exited in the direction of its 0 state so that the voltage or absence of a voltage associated with this operation signifies the previous 1 or 0 state of the core; this operation is called read. Usually the cores and wires are arranged so that read and write operations are performed on a group of cores that is called a word. This invention is particularly directed to an organization of the words in a matrix.

INTRODUCTION—THE PRIOR ART

In one known organization of the cores and wires, there are two wires for each core. For writing, a wire that is common to all the cores of a word (a word line) is energized with a current of less than the level to switch a core (a level called a half select); for cores of the word that are to store a 1, the other wire (called a bit line) is energized with a half select current to switch the core to a 1 signifying direction. For reading, the word line is energized with a full select current. The bit lines each couple a core to a sense amplifier that responds to the voltage that is produced when a core switches from a 1 to a 0 state. It will be convenient to think of the word lines as being in columns and the bit lines as being in rows.

In the storage device just described, the number of columns equals the number of words and the number of rows equals the number of bits in each word. Ordinarily the number of words in a storage device is much larger than the number of bits per word. Because it is desirable to make the number of rows and column wires more nearly equal, the number of rows is sometimes made an integral multiple of the number of bits per word. Thus for each bit position, there are several bit lines, each corresponding to the same bit position in a different word. The structural word on a word line is several times larger than the functional word that is intended to be read. In some memories of this type, all the words on a common word line are read out during a read operation, and circuitry is provided to select the particular word that is wanted. Registers are provided to receive and temporarily store each of the words that is read out in parallel. The selected word transmitted to its destination, and the unselected words are regenerated in the following write operation.

Another arrangement has been to provide inhibit currents on the bit lines of the words that are to be not read. These cores receive only a net half select current and do not produce output signals. Thus the bit wire at various times carries bit currents, inhibit currents and signal currents. This arrangement can substantially complicate the interconnection of the bit lines, the bit drivers, and the sense amplifiers. A general object of this invention is to provide an improved memory that operates in this mode.

SUMMARY OF THE INVENTION

In the magnetic storage device of this invention, several words are arranged on each word line and all of these words are excited with a full select current on the word line during a read operation. The unselected words are kept from being read out by energizing their bit lines with half select currents that inhibit the read operation. The bit lines of the selected word do not receive this half select inhibit current; their cores receive only the full select read current on the word line. The selected bit lines couple the cores of the selected word to individual sense amplifiers.

In one embodiment of the invention, there is a single sense amplifier for each bit position. Each sense amplifier is connected by means of a gate to each bit line of the corresponding bit position. In a read operation, one bit line of each sense amplifier is coupled to cores of the selected word and the other bit lines each receive the inhibit current. The gate is arranged to isolate the unselected lines from the sense amplifier and to couple the sense amplifier to only the selected bit line of the group.

In a second embodiment of the invention, the bit lines of the same bit position are interconnected by diodes in a ladder-like network. Only the selected bit driver is energized during a read operation; the diodes connect the other bit lines in two series circuits such that the unselected bit lines receive the half select inhibit current but the selected bit line does not.

The foregoing and other objects, features and advantages of the invention will be apparent from the following more particular description of preferred embodiments of the invention, as illustrated in the accompanying drawings.

THE DRAWING

THE STORAGE DEVICE OF FIG. 1

Figure 1:
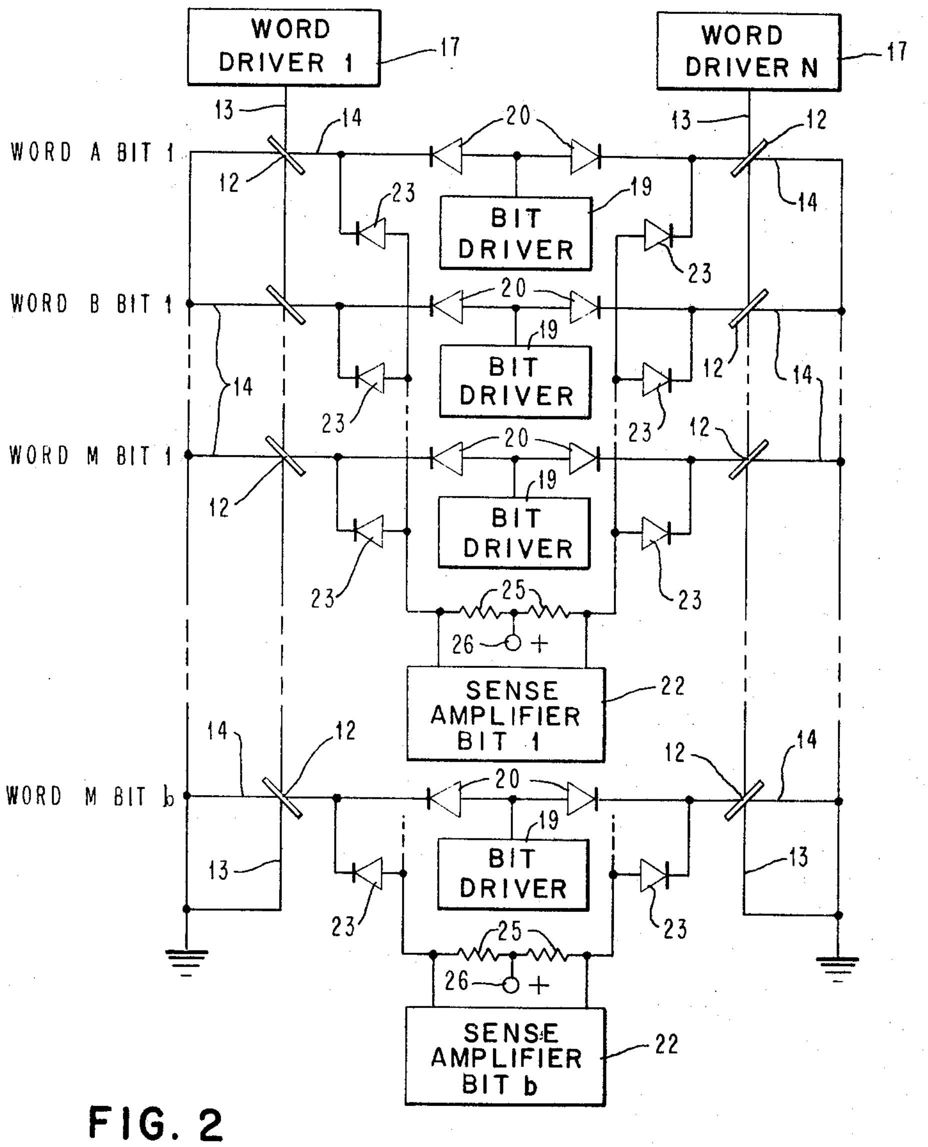
FIG. 1 is a schematic of the storage device of one embodiment of the invention.

This description will first consider the aspects of the circuit of FIG. 1 that are conventional and will then consider the pulse program and the circuitry for producing the pulse program and the circuits for sensing signals produced during a read operation.

The storage device of FIG. 1 has a plurality of ferrite torodial ferrite cores 12 or other suitable magnetizable elements arranged at intersections of word lines 13 that are arranged in columns and bit lines 14 that are arranged in rows. The device has a number of bits per word that is designated *b* for generality; a typical number is 72. The device also has a particular number of words; this number is the product of two integers M and N. There are N words along the top of the array and M words along the side. The words along the top of the array can be identified by numbers and the generalized last number is designated N. The words along the side can be designated by letters and the generalized last number is designated M. On each word line 13 the number of cores is the product of the integers $b$ and M. There are M groups of bit lines each having $b$ wires forming a complete word.

The drawing shows representative cores and lines and their drivers. The bit lines 14 and bit drivers 19 are shown for bit position 1 of words A, B and M and for bit position $b$ in word M. The bit lines 14 are arranged in balanced pairs that are connected to be driven simultaneously from a common driver. The two lines of each pair can be located on opposite sides of a ground plane. Diodes 20 in the bit lines isolate the drivers from the line during a read operation. The drivers 17 for words 1 and N along the top of the array illustrate that each line of a pair of bit lines intersects separate sets of word lines.

The storage device of FIG. 1 includes a sense amplifier 22 for each bit position. Each sense amplifier is connected by a gate to each bit line 14 of the associated bit position. Each sense amplifier has two input terminals connected to the opposite lines of the pairs. The sense amplifier responds to the difference in signals on the paired lines and thereby tends to reject certain extraneous signals as is well known.

The gate comprises a plurality of diodes 23 connecting the bit lines to an input of a sense amplifier and resistors 25 that are connected to a potential point 26 to bias diodes 23 to conduct in the absence of an inhibit signal. The voltage of point 26 is less than the voltage that is applied to the diodes by the unselected bit drivers 19 during a read operation. When the unselected bit drivers are turned on, the associated diodes become back biased and turn off and thereby isolate the bit lines from the sense amplifier input terminals. The diode 23 for the selected bit line remains conducting in circuit with resistors 25 and thereby couples the selected bit line to the inputs of the sense amplifier.

OPERATION OF THE STORAGE DEVICE OF FIG. 1

Figure 2:
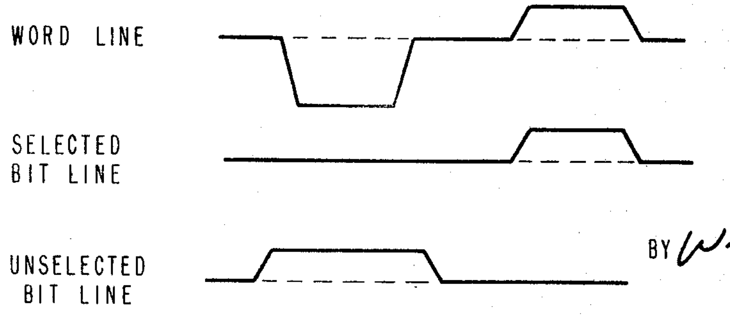
FIG. 2 is a series of wave forms associated with the circuit of FIG. 1.

FIG. 2 shows the currents on the selected word line and the selected bit line during a read operation followed by a write operation. In a read operation the selected word line is energized with a full select current in the read direction. The selected bit lines are not energized. Thus the cores of the selected word receive a full select current that operates conventionally to produce a read operation. Th unselected bit lines are energized with a half select current (not shown) that is in the direction to inhibit the read effect of the word current. The inhibit currents are begun before the word current and are terminated after the word current. Thus the unselected cores on the energized word line receive a net half select current in the read direction. This current level is insufficient to produce a read operation.

In a write operation the selected word line and the bit lines of the selected word for the big positions that are to store a 1 are conventionally energized with half select currents as shown in FIG. 2. The unselected bit lines are not energized.

THE STORAGE DEVICE OF FIG. 3

Figures 3, 4:
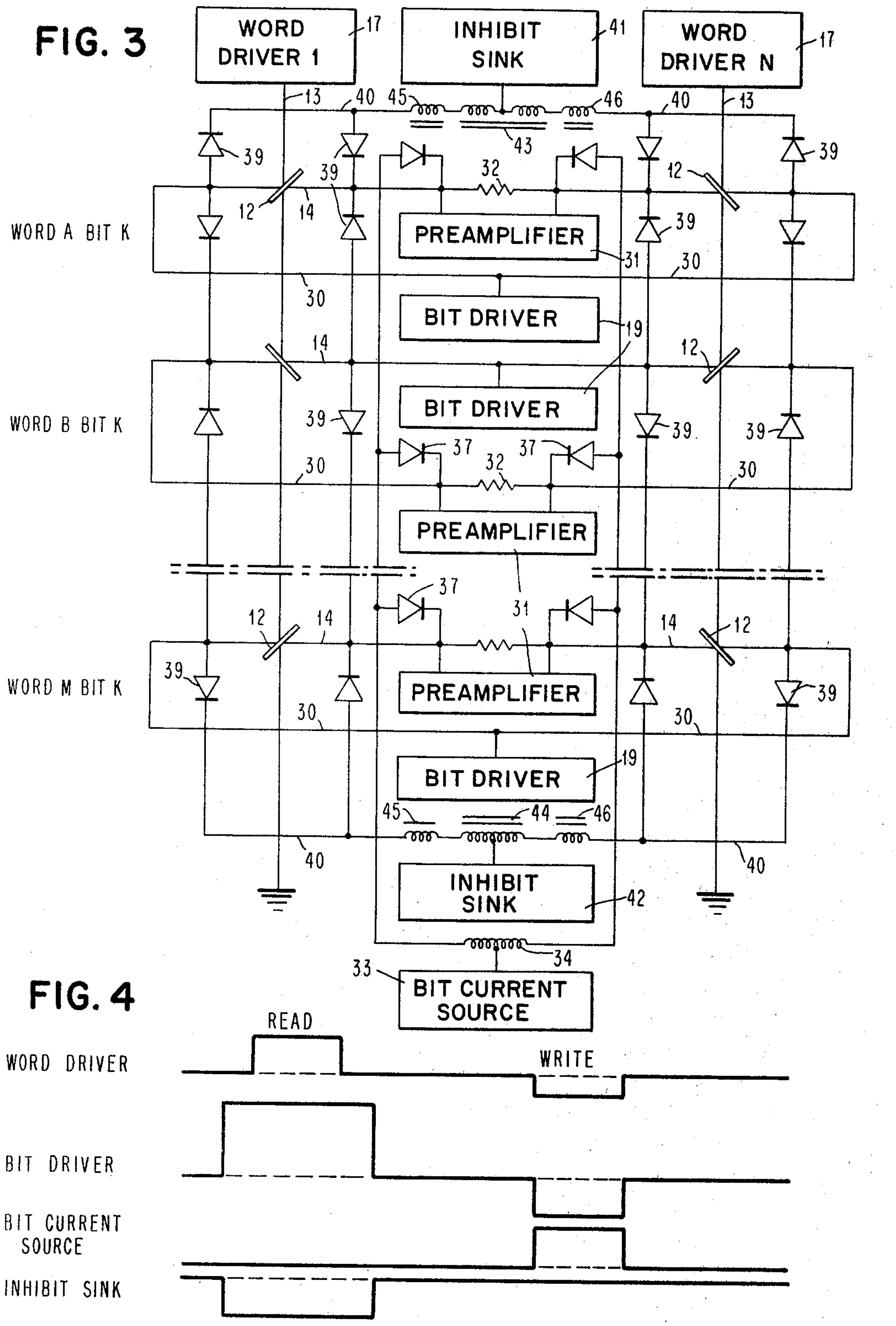
FIG. 3 is a schematic of a second embodiment of the invention.
FIG. 4 is a series of wave forms associated with the circuit of FIG. 3.

The storage device of FIG. 3 is generally similar to the device of FIG. 1 except that the bit lines 14 are arranged to conduct the inhibit current in series circuits. With this feature the circuit of FIG. 3 requires less inhibit current than the circuit of FIG. 1 but the longer inhibit path can make the device of FIG. 3 slower. Corresponding components have the same identifying number in both figures. FIG. 3 shows the representative bit lines for the generalized bit position $k$ for words, A, B and M. The bit lines 14 are drawn somewhat differently to more clearly illustrate the interconnection of these lines, and the schematic for the bit line includes a return conductor 30. When the bit lines of each pair are located on opposite sides of a ground plane, line 30 is a jumper across an edge of the plane.

The circuit of FIG. 3 includes a preamplifier 31 for each bit line. The preamplifier has two input terminals connected to receive the voltage developed across a resistor 32 connected in the associated bit line. The outputs of all the preamplifiers for the same bit position are connected to the input of a common amplifier (not shown) for the corresponding bit position. During a read operation, the preamplifier associated with the selected bit line pair is controlled to transmit signals to the common amplifier.

A bit current source 33 is connected through a current balancing transformer 34 and through a group of isolating diodes 37 to each bit line at the end of the line remote from the input of the bit driver 19. For a write operation, the bit current source 34 and the selected bit driver are turned on to provide a full select current at the output terminals of the bit driver and the bit current source (as shown in FIG. 4). The balancing transformer 34 divides the current into two half select currents for each part of the selected bit line.

The bit lines are interconnected in a ladder-like network by means of diodes 39. Two diodes are connected at the driver end of each bit line and two diodes are connected at the end remote from the driver. These four diodes connect each bit line to the opposite end of the bit line above and below it in the drawing. At the top and bottom of this network a dummy line 40 is provided. An inhibit current sink 41 is connected to the upper dummy line 40 an an inhibit sink 42 is connected to the lower line 40. FIG. 4 shows relative polarities of drivers 19 and sinks 41 and 42. Transformers 43, 44, 45 and 46 are arranged so that the inhibit currents are equal in all four lines 40 at the two connections to the inhibit sinks (transformers 45 and 46 have windings in both the upper and lower dummy lines).

OPERATION OF THE STORAGE DEVICE OF FIG. 3

In a read operation the bit drivers of the selected word are turned on and the two inhibit sinks 41 and 42 are turned on. As FIG. 4 shows, the bit driver conducts 2 full select currents and the inhibit sinks each conduct a full select current. At the four diodes 39 connected to the output of the selective driver, the current divides into four branches and zigzags through the unselected bit lines to the inhibit current sinks. For example, when the driver for word A bit $k$ is turned on, current flow towards the center of the drawing in the bit lines of words B and in the dummy lines 40. Current flows outward in the bit line for word M. The cores in the drawing are slanted to show a physical arrangement such that the effect of the current is to inhibit each core in the inhibit circuit. The voltage at the output terminal of the selected driver is appropriate with respect to the voltage at the sense preamplifiers 31 such that inhibit current does not flow in the selected bit line. For example, for the polarity of diodes 39 in the drawing, the selected driver can produce ground potential at its output, each inhibit sink can produce a negative voltage at its output, and the input to the preamplifiers can be kept at ground potential. The circuit traced for the operation of reading word A illustrates the inhibit current flow when any bit driver is selected.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A storage device of the type having word lines and bit lines arranged in a matrix and storage elements arranged at the intersections of the word and bit lines, each word line having the storage elements of a plurality of words, whereby an addressed word is represented by storage elements at the intersection of an addressed word line and addressed ones of said bit lines, means to energize an addressed word line with a full select current in a polarity appropriation for a read operation and to energize the unaddressed ones of said bit lines with a fractional select current appropriate in amplitude, polarity and timing for inhibiting a read operation at unaddressed word locations on the addressed word line, whereby signals representing data appear on only the addressed bit lines, and a single sense amplifier for each bit position, wherein the improvement comprises, diodes connecting the plurality of bit lines for a bit position to the input of the corresponding sense amplifier, said diodes being connected in a direction to turn off in response to said inhibiting current in the unaddressed ones of said bit lines during a read operation to maintain said addressed bit lines electrically independent of said unaddressed bit lines, and means connected to the terminals of said diodes opposite said bit lines to provide potentials on said diodes that maintain said diodes conductive to relatively low voltages of said signals and nonconductive in repsonse to the higher voltages associated with said inhibiting bit currents.

2. A storage device according to claim 1 in which said bit lines are arranged in pairs tending to cancel the effects of bit currents at the inputs of said detecting means.

3. A storage device of the type having word lines and bit lines arranged in a matrix and storage elements arranged at the intersections of the word and bit lines, each word line having the storage elements of a plurality of words, whereby an addressed word is represented by storage elements at the section of an addressed word line and addressed ones of said bit lines, comprising sensing means individual to each of said bit lines and connected to predetermined ends of said bit lines to receive storage element signals, diodes connecting ends of said related bit lines into a ladder-like network in which the direction of conduction of said diodes is the direction to inhibit a read operation, and dummy bit lines forming the ends of said network, means to energize an addressed word lines with a full select current in a polarity appropriate for a read operation and in a current appropriate for a write operation, bit drivers connected to predetermined ends of each bit line except said dummy bit lines, and means to turn on addressed ones of said drivers during read operations to inhibit read operations on the storage elements of the unaddressed ones of said bit lines and to turn on addressed ones of said bit drivers according to data to be written during write operations, an inhibit current sink connected to cooperate with an addressed bit driver during read to provide inhibit current in said unaddressed bit lines, and a bit current sink connected to cooperate with an addressed bit driver during write to provide currents only in an addressed bit line.

4. A storage device according to claim 3 in which said bit lines are arranged in balanced pairs, each pair being coupled to one bit driver and one preamplifier.

5. A storage device according to claim 4 in which said diodes are connected in a polarity to conduit in circuit with a bit driver and an inhibit sink on only said unaddressed bit lines during read and to conduct in circuit with a bit driver and a bit current sink on only an addressed bit line during write.

6. A storage device according to claim 5 including means to balance the inhibit currents on the two paths of said ladder-like network adjacent the addressed bit line.

7. A storage device according to claim 6 in which during a read operation an addressed bit driver provides a double full select current and each unaddressed bit line receives a half select current and during a write operation an addressed bit driver provides half select currents on the associated pair of addressed bit lines.

References Cited

UNITED STATES PATENTS

| | | | |
|---|---|---|---|
| 2,902,677 | 9/1959 | Counihan | 340—174 |
| 3,209,337 | 9/1965 | Crawford | 340—174 |

BERNARD KONICK, Primary Examiner

S. B. POKOTILOW, Assistant Examiner